July 10, 1945.   R. M. HARDGROVE   2,380,041
FUEL BURNING APPARATUS
Filed Sept. 30, 1941   6 Sheets-Sheet 4

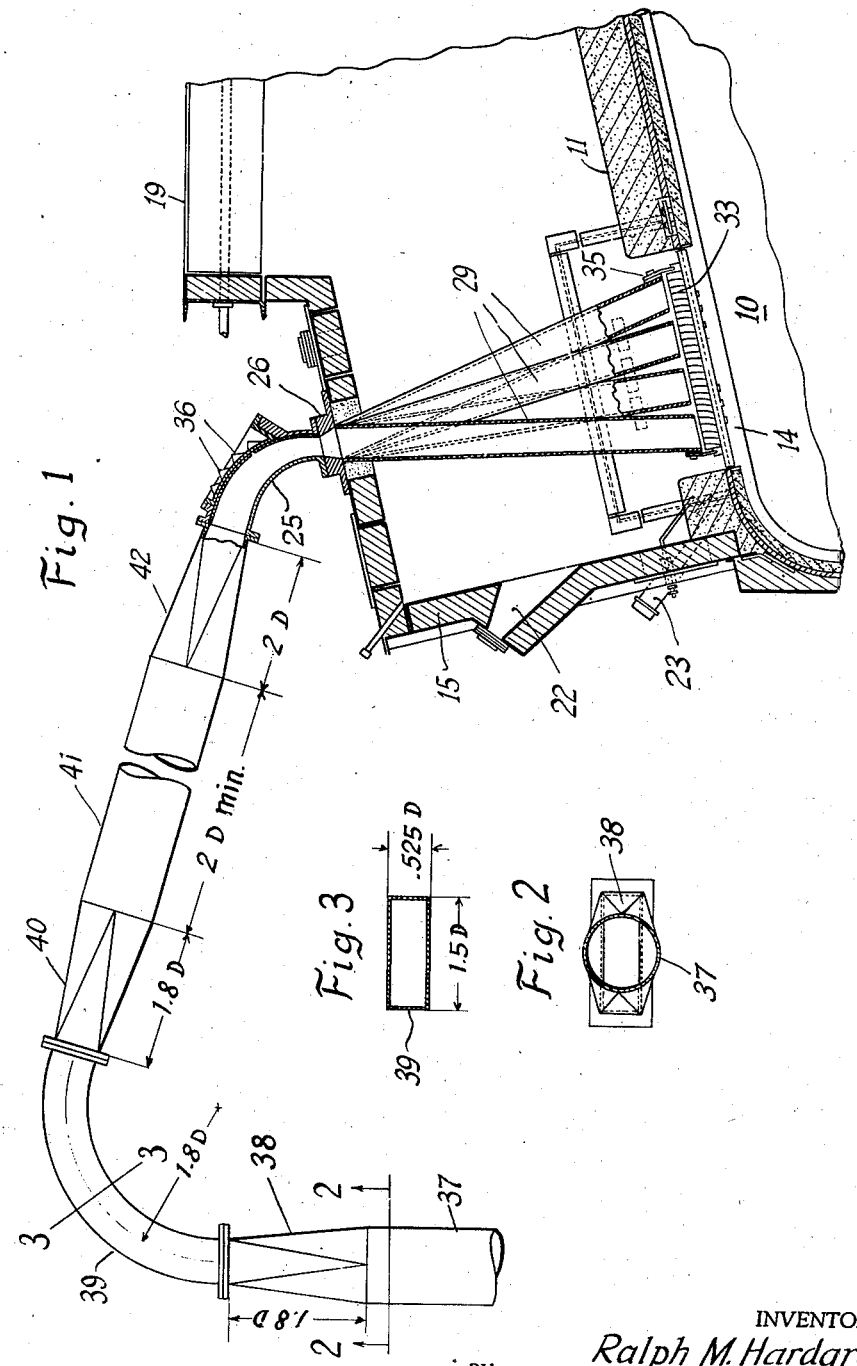

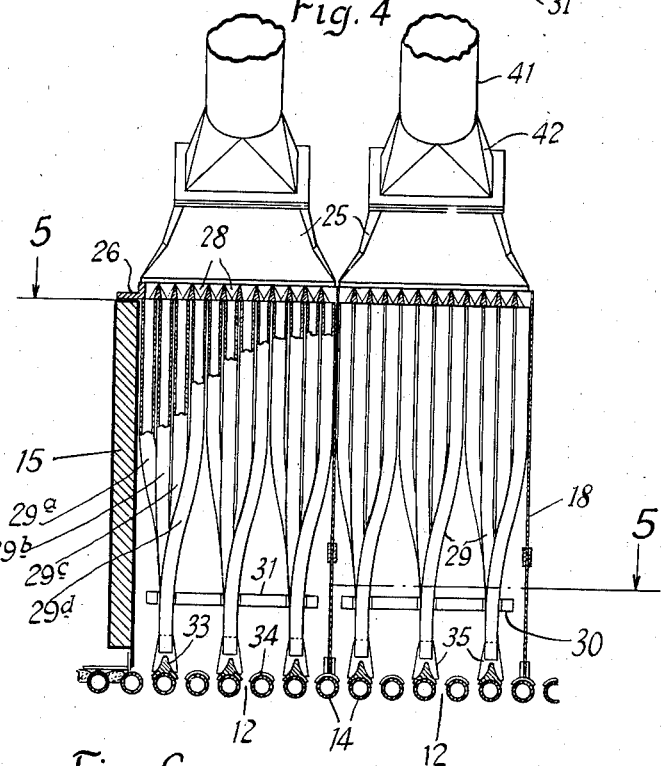

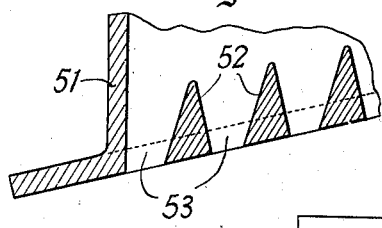
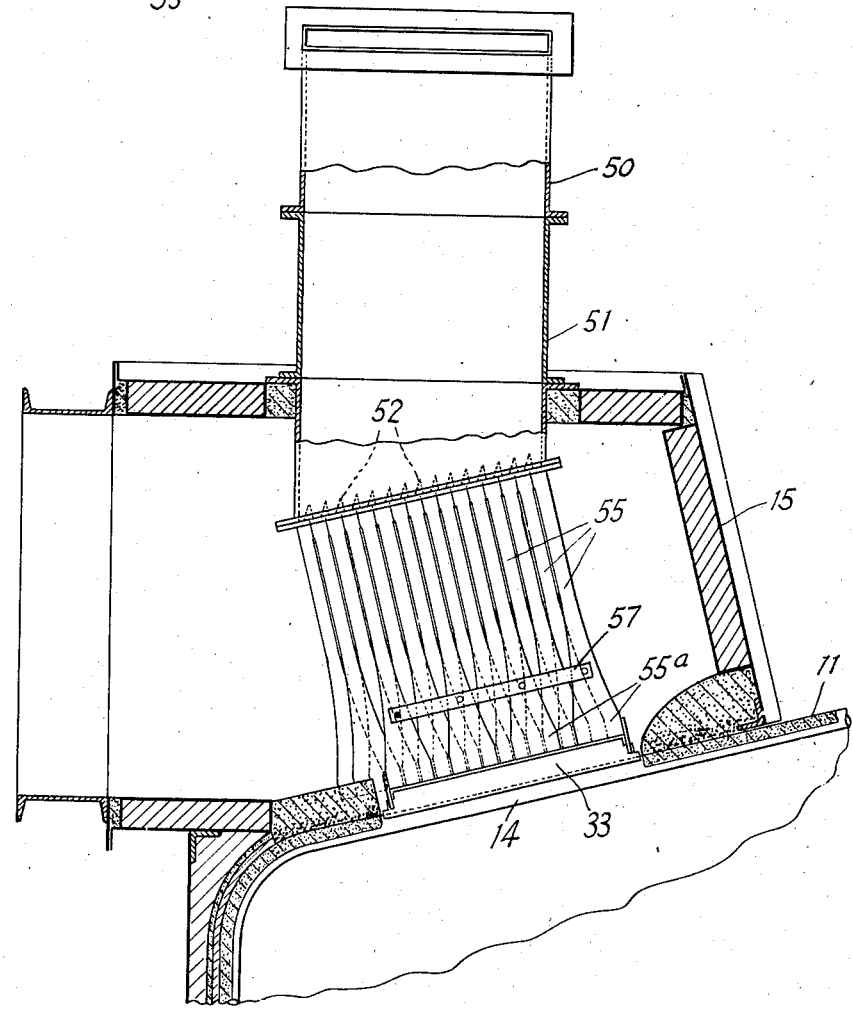

INVENTOR.
Ralph M. Hardgrove
BY Joseph Moran
Attorney

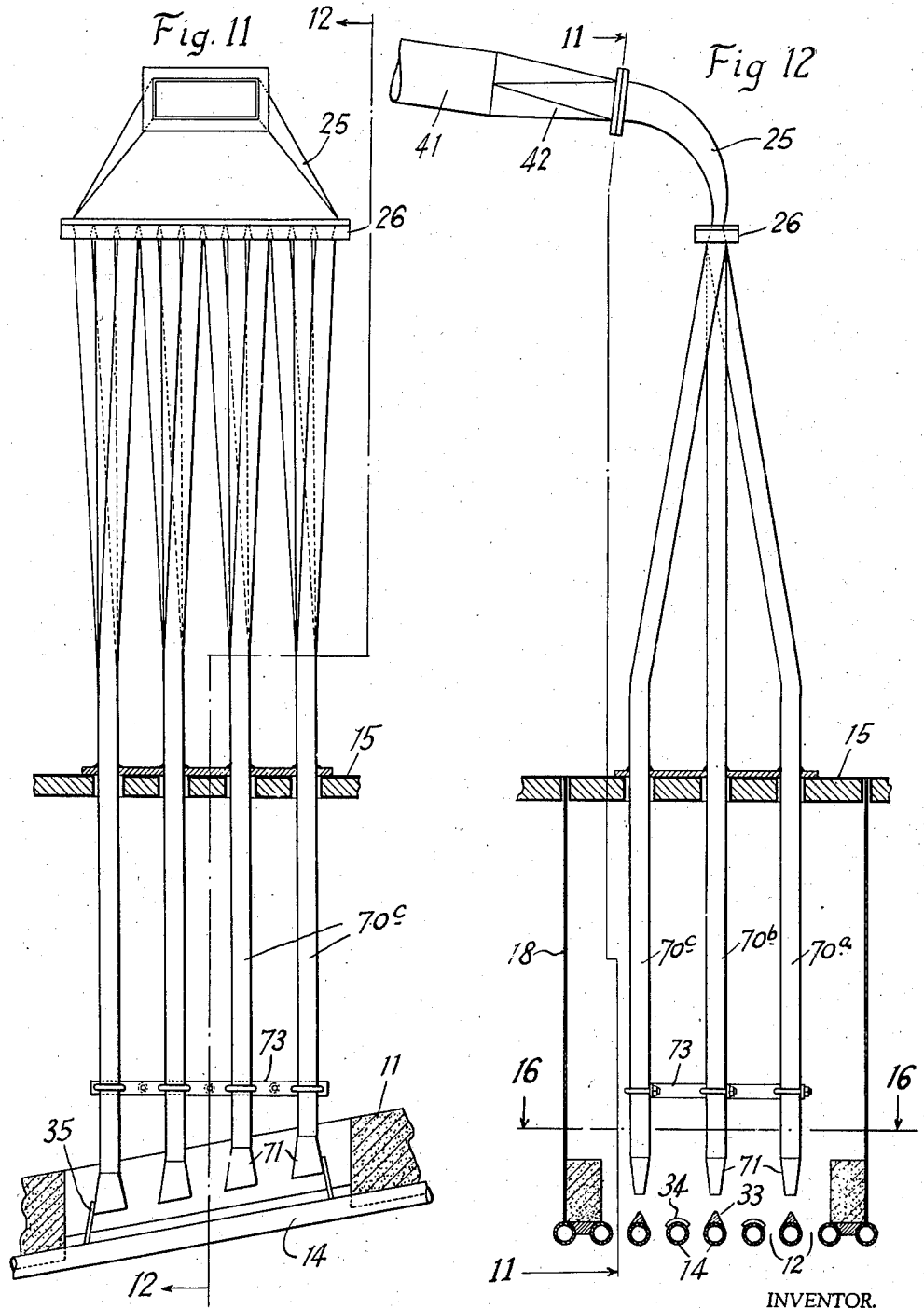

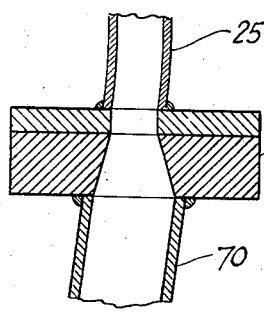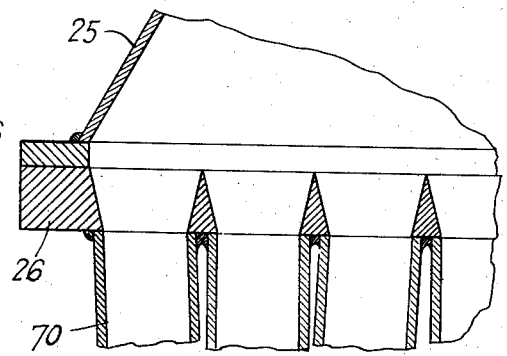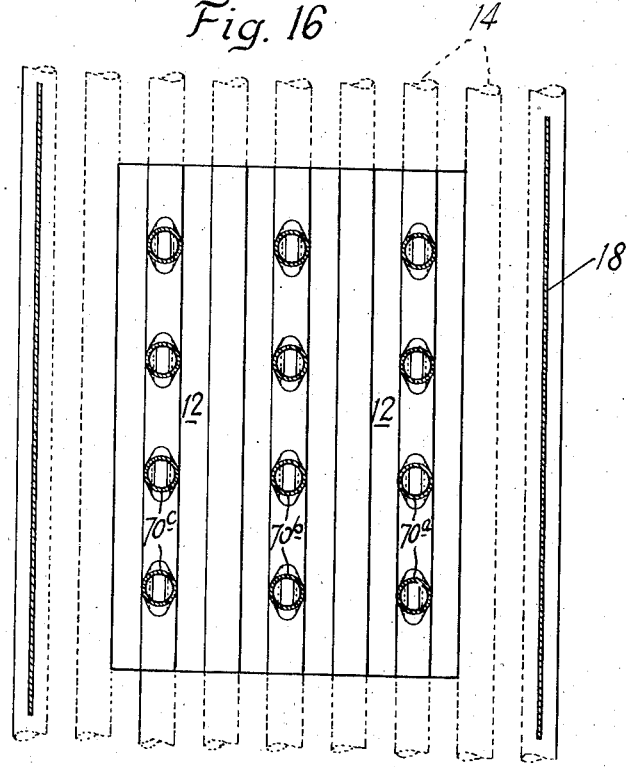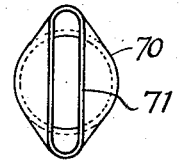

Patented July 10, 1945

2,380,041

UNITED STATES PATENT OFFICE 2,380,041

FUEL BURNING APPARATUS

Ralph M. Hardgrove, Westfield, N. J., assignor to
The Babcock & Wilcox Company, Newark, N. J.,
a corporation of New Jersey Application September 30, 1941, Serial No. 412,921

15 Claims. (Cl. 110—104)

The present invention relates in general to the construction and operation of fuel burners, and more particularly, to the construction and operation of pulverized fuel burners of the multiple discharge outlet type which are adapted for installation in a furnace wall burner port across which extends a row of spaced wall tubes or fuel deflectors.

The main object of my invention is to provide an improved construction and arrangement of a fuel burner of the character described which affords a substantially uniform distribution of the fuel over the effective fuel entrance area of the burner port and an intimate and rapid mixing of the entering fuel with the required air for combustion, whereby short flame combustion conditions and a high rate of heat release can be effectively secured. A further object is the provision of pulverized fuel burning apparatus of the character described which has a particularly low pressure drop therethrough, and a relatively low cost of construction and installation. A further object is the provision of an improved pulverized fuel supply conduit construction which is especially adapted for use with pulverized fuel burners of the character described, which insures a substantially uniform distribution of the pulverized fuel particles in the pulverized fuel-air stream reaching the fuel burner.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Of the drawings:

Fig. 1 is a side elevation, partly in section, of one embodiment of my invention;

Figs. 2 and 3 are sections taken on the lines 2—2 and 3—3 respectively of Fig. 1;

Fig. 4 is a front elevation, partly in section, of a portion of the apparatus shown in Fig. 1;

Fig. 5 is a horizontal section taken on the line 5—5 of Fig. 4;

Fig. 6 is an enlarged view of a portion of the riffle of Fig. 5;

Fig. 7 is a view similar to Fig. 1 of another embodiment of the invention;

Fig. 8 is a view similar to Fig. 6 of a portion of Fig. 7;

Fig. 11 is a view similar to Figs. 1 and 7 of a further modification taken on the line 11—11 of Fig. 12;

Fig. 12 is a side elevation, partly in section, taken on the line 12—12 of Fig. 11;

Fig. 13 is a view similar to Figs. 6 and 8 of a portion of Fig. 12;

Fig. 14 is a central, vertical, sectional view through a burner tip member of the type shown in Fig. 13;

Fig. 15 is a bottom view of a burner tip; and

Fig. 16 is a horizontal section taken on the line 16—16 of Fig. 12.

Figure 10:
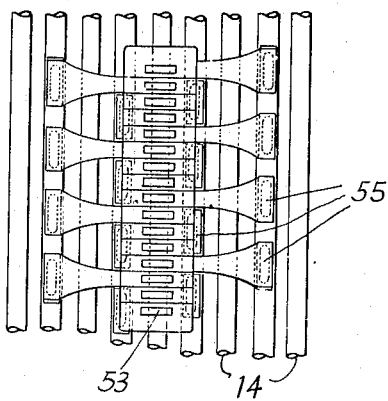
Fig. 10 is a horizontal section taken on the line 10—10 of Fig. 9.
Figure 9:
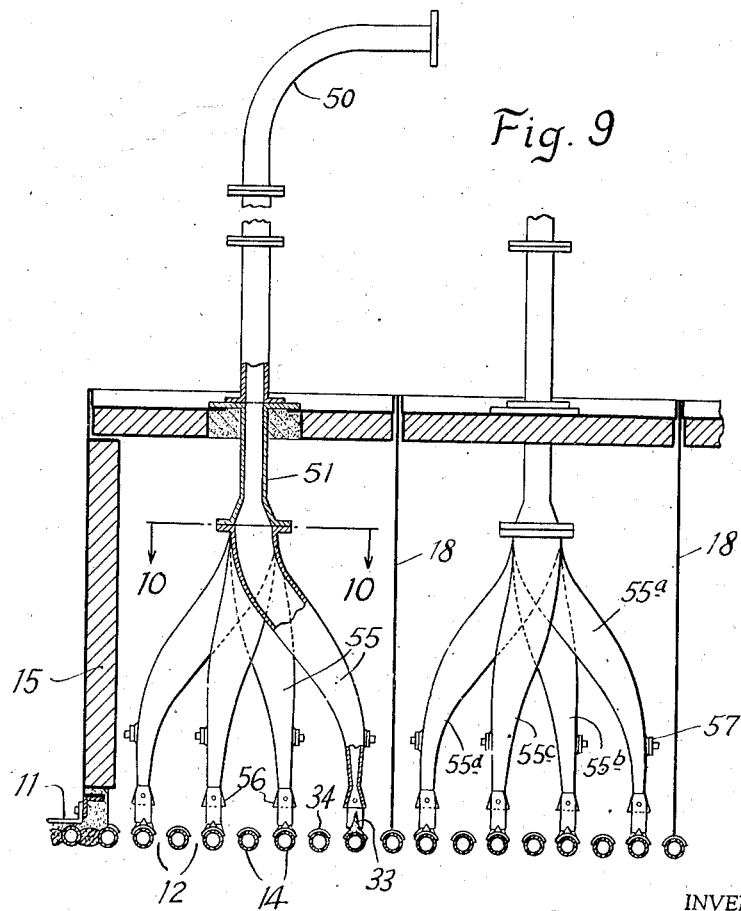
Fig. 9 is a view similar to Fig. 4 of the fuel burner construction shown in Fig. 7.

In the drawings my invention is illustrated as embodied in several forms of pulverized fuel burners arranged for downfiring through the roof of a fluid cooled furnace having a row of wall cooling tubes extending across the burner port in transversely spaced relation. In the embodiment illustrated in Figs. 1–6, a furnace chamber 10 having a horizontally inclined roof 11 is provided with a rectangular burner port 12 across which extends a row of similarly inclined fluid heating tubes 14 in transversely spaced relation. The burner port is elongated transversely of the tube row and opens into a surrounding wind box 15 for combustion air. The wind box 15 is divided by vertical partitions 18 extending parallel to the tubes 14 into a plurality of side-by-side chambers forming in effect a row of separate burner ports, each of which is occupied by a pulverized fuel burner constructed and arranged in accordance with the invention. With this arrangement each of the burner ports receives a supply of combustion air from its own damper-controlled inlet 19. Each wind box section has an observation door 22 and fuel igniting provisions 23.

In accordance with my invention a fuel supply conduit delivers a uniformly distributed stream of pulverized fuel and carrier air through a curved distributor section 25 which is flattened into a flaring rectangular transverse section, which, in the embodiment shown in Figs. 1–6, is elongated in a direction transversely of the burner port tubes 14. The lower or discharge end of the distributor is connected to and registers with a flow division box or riffle 26 mounted on the wind box. The outer wall of the section 25 has a curvature at its lower end which tends to direct the downflowing fuel particles towards the opposite side of the riffle 26. The riffle 26 is subdivided transversely by a series of riffle bars 27 of upwardly tapering cross-section and uniformly spaced to divide the member 26 into a row of side-by-side slots 28 of similar shape and cross-sectional area. In the construction shown, eleven riffle bars are provided in the riffle 26 to form twelve slots or discharge openings 28, so that each of the discharge slots will receive a stream of pulverized fuel and carrier air in substantially the same fuel-air ratio.

Each discharge slot 28 is connected to a separate tubular member or burner tip 29 which extends from the bottom of the discharge slot to a point slightly above the level of the burner port tubes 14. The tubular members 29 are of flattened oval transverse cross-section throughout their lengths, the elongation being in a direction parallel to the tubes 14. To compensate for any inequalities in distribution of the pulverized fuel to the discharge slots 28, the burner tips 29 are arranged in groups with the tips in each group receiving pulverized fuel and air from different portions of the main fuel-air stream from the distributor 25, and delivering the different portions to the same section of the corresponding burner port. For example, in each embodiment of the invention a group of selected burner tip members receiving pulverized fuel and air from different portions of the main fuel-air stream have their discharge ends in alignment longitudinally of corresponding burner port tubes. In the embodiment illustrated in Figs. 1–6, each group consists of four adjoining burner tip members 29, with the burner tips in each group having their lower ends arranged to discharge through the same intertube spaces of the burner port. As illustrated, each group includes burner tips 29$^a$, 29$^b$, 29$^c$, and 29$^d$, the upper ends of which are arranged side-by-side and the lower ends of which are bent into alignment and spaced longitudinally of the same tube 14, as shown in Figs. 4 and 5, at opposite sides of the row of discharge slots 28. The lower ends of the burner tips of each group are fixed in position by tube spacers 30 consisting of angle bars connected to each burner tip and to each other, while the adjoining groups are held in fixed relation by spacer bars 31 connecting corresponding tube spacers 30 of adjoining groups. Alternate burner port tubes 14 are provided with heat resistant tube protectors 33 of upwardly tapering ribbed cross-section and symmetrically arranged relative to the corresponding tube and group of burner tips. The intervening tubes have circular protectors 34 on their upper sides. The position of the burner tips relative to the tubes 14 is also fixed by notched plates 35 fitting over the corresponding tube protectors 33 and secured to the burner tips at the end of each group, as shown in Figs. 1 and 4. Holes for lancing tips are provided in bosses 36 on the outer wall of the distributor 25 and in alignment with corresponding burner tip members.

With the described arrangement the entering stream of pulverized fuel, such as pulverized coal, and primary combustion or carrier air is divided by the riffle into twelve portions transversely of the tube row 14. Each portion flows downwardly through the corresponding tip member and impinges on a corresponding tube protector which divides the stream into two substantially equal portions entering the furnace chamber through the adjoining spaces between the burner port tubes 14. As each small stream of pulverized fuel and primary air is discharged from the corresponding burner tip member it is surrounded by secondary combustion air flowing through the wind box 15, which is normally under pressure, so that a rapid and intimate mixture of the pulverized fuel and the air necessary for its combustion is readily secured as the fuel and air passes between the burner port tubes 14. This subdivision of the main fuel and primary air stream into a large number of small streams and the grouping of those streams in the described manner insures a substantially uniform ratio of the entering fuel and air throughout the fuel entrance area of the burner port and the maintenance of short flame turbulent combustion in the furnace chamber.

Special provisions are illustrated for insuring the delivery of a uniform mixture of pulverized fuel and primary air to the distributor section 25, as shown in Figs. 1–3. When the furnace is direct-fired a supply pipe 37 receives a mixture of pulverized fuel and air from a suitable pulverizer connected to its lower end. As long as the fuel-air mixture is traveling vertically, its density will be substantially uniform throughout its cross-sectional area, but any changes from the vertical will effect a redistribution of the fuel particles in the flowing stream due to gravitational and/or centrifugal effects thereon. The portion of the supply conduit in which the necessary bends are included to connect the same to the downwardly discharging distributor is specially constructed to control the segregation of the fuel particles therein due to centrifugal force, while retaining a low pressure drop through this portion of the supply conduit. For this purpose the upper end of the vertical portion of the pipe 37 leads into a vertical transition section 38 which is shaped to progressively convert the circular cross-section of the pipe into a flattened rectangular section, as shown in Figs. 1 and 2. The transition section 38 in turn is connected to a similarly flattened bend section 39 of the cross-sectional form shown in Fig. 3, the elongation thereof being in the same direction as the elongation of the distributor 25. The bend section 39 in turn connects to a transition section 40 which converts the flattened rectangular flow area into a circular cross-section corresponding to the circular cross-section of a following straight section 41. The straight section 41 in turn connects to a third transition section 42 which converts the circular flow area into a flattened rectangular flow area elongated in the same direction as and registering with the upper end of the distributor 25. As shown in Figs. 1 and 4, the distributor section flares outwardly in the direction of its elongation while tapering towards its lower end where it joins the riffle 26.

It has been found that the best results for obtaining the delivery of a pulverized fuel-primary air stream of substantially uniform density to the upper end of the distributor is attained by using certain proportions of the lengths and dimensions of the conduit sections 38, 39, 40, 41, 42, and the distributor 25. When D is the diameter of the straight section 41, the transition section 38 should be approximately 1.8D in length, the flattened bend section 39 should have a radius of approximately 1.8D, linear dimensions of approximately .525D×1.5D, and an arcuate length of 80° to 180°. The transition section 40 should have a length of approximately 1.8D while the straight section 41 should be at least 2D in length and normally not more than 8D. The transition section 42 should be approximately 2D in length with an angle of flare of not more than 16°. The distributor should have a minimum length of 1.88 (3N—1.56D) where N is the number of burner tips employed. The distributor should preferably flare at an angle of not more than 30° when the above length is used, and in any case be approximately 10° larger than the angle formed by the flared sides of the transition section 42. The distributor should also be curved with a radius of from 12 to 18 inches and with an arcuate length of from 80° to 120°. The foregoing arrangement permits the approach section of the fuel supply conduit to have a constant cross-sectional area throughout its length, so that the pressure loss through this section will be kept as low as possible. The described construction of the approach section of the fuel supply conduit has been found to result in the delivery of a fuel-air stream of approximately uniform density throughout the flow area of the distributor riffle, and consequently a substantially uniform distribution of the fuel throughout the burner port fuel entrance area.

In the modification illustrated in Figs. 7–10, a construction of the distributor and fuel burner is illustrated for installation in which the fuel supply conduit is at an angle of approximately 90° to the arrangement shown in Fig. 1. In this construction the stream of pulverized fuel and carrier air is delivered to a curved nozzle extension 50 of a distributor 51, the nozzle and distributor being of flattened rectangular cross-section and elongated in the same direction as the furnace roof tubes 14. The nozzle and distributor are of uniform rectangular cross-sectional area throughout their length, the distributor having at its flanged lower end an inclined row of riffle bars 52 uniformly spaced therein to provide the desired number of fuel discharge slots 53. The arrangement of the distributor 51 and row of discharge slots 53 lengthwise of the tubes 14 affords an advantageous arrangement for the burner tip members 55 connected thereto relative to the burner port. As shown in Fig. 10, sixteen discharge slots 53 are provided and a corresponding number of burner tip members 55 connected thereto. Each of the burner tips 55 has an upper flanged end connected to the lower end of the distributor 51 and tapers downwardly in a direction transversely of the tube row while flaring in a direction lengthwise of the tubes 14. The lower end of each burner tip is formed by a short welded section 56 of heat resistant alloy steel which flares outwardly on all sides.

The burner tips are arranged in groups $55^a$, $55^b$, $55^c$ and $55^d$, each group consisting of four selectively spaced burner tips, in this embodiment every fourth burner tip, receiving pulverized fuel and air from different portions of the main fuel-air stream and having their discharge ends in alignment longitudinally of corresponding burner port tubes. In this construction however all of the burner tips have their lower ends offset and adjacent burner tips have their discharge ends arranged superjacent to different alternate tubes of the tube row 14 at opposite sides of their connection to the distributor 51. Corresponding burner tips in the groups are not in alignment transversely of the tube row 14 but instead are slightly staggered, as indicated in Fig. 10. All of the burner tips of each group are arranged in a similar manner over the same burner port tube 14. The discharge ends of the burner tips are similar in cross-section to those shown in Fig. 5, and also are elongated in the direction of the tubes 14. The burner tips of each group are held in fixed spaced relation by tie bars 57 secured along the sides thereof and are also supported on the tube protectors 33 in the manner previously described.

With this construction and arrangement of the fuel burner ports, each alternate port tube 14 will be impacted by flattened fuel streams at spaced points, with the fuel streams impacting each tube being substantially identical in fuel-air ratio to those impacting the remaining alternate tubes, due to the arrangement of selectively spaced burner tips relative to the same tube. The group of burner tips over each tube thus receive fuel and air streams from substantially the entire length of the distributor. A substantially uniform distribution of the entering fuel and air is thus attained throughout the fuel entrance area of the burner port. The individual fuel streams are subdivided and intimately mixed with the surrounding secondary combustion air in the manner previously described.

In the modification illustrated in Figs. 11–16, a fuel burner having twelve burner tips is illustrated. In this construction the burner tip members 70 are of circular cross-section and uniform diameter substantially throughout their entire length, with their lower end portions 71 flattened as illustrated in Fig. 15, the elongation being in the direction of the burner port tubes 14. The burner tips are divided into groups $70^a$, $70^b$, and $70^c$, each group consisting of four selectively spaced tip members, in this embodiment every third burner tip, receiving pulverized fuel and air from different portions of the main fuel-air stream and having their discharge ends in alignment longitudinally of the same burner port tube in the same manner as the modification illustrated in Figs. 7–10, except that in the construction shown in Figs. 11–16 the corresponding tip members of the groups are in alignment transversely of the tubes 14. All of the burner tip members are held in fixed relation by spacer members 73. The operation of the burner construction shown in Figs. 11–16 is substantially the same as that shown in Figs. 7–10.

While in accordance with the provisions of the statutes I have illustrated and described herein the best forms of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a furnace having a burner port in one of the walls thereof, and a row of spaced fluid heating tubes extending across said burner port, fuel burning apparatus comprising a conduit for conveying a stream of pulverized fuel and air and terminating in a section of elongated cross-section, means for dividing the fuel stream into a series of small streams arranged side-by-side, and a series of burner tip members arranged to receive corresponding fuel streams, said burner tip members being arranged in groups with the burner tip members of each group having their discharge ends in alignment longitudinally of corresponding burner port tubes.

2. In a furnace having a burner port in one of the walls thereof, and a row of spaced horizontally arranged fluid heating tubes extending across said burner port, fuel burning apparatus comprising a conduit for conveying a stream of pulverized fuel and air and terminating in a section of elongated cross-section, means for dividing the fuel stream into a series of small streams arranged side-by-side in a single row, and a series of burner tip members arranged to receive corresponding fuel streams, said burner tip members being arranged in groups with the burner tip members of each group having their discharge ends in alignment longitudinally of corresponding subjacent burner port tubes and the discharge ends of at least some of said burner tip members being arranged at opposite sides of said stream dividing means.

3. In a furnace having a burner port in one of the walls thereof, and a row of spaced fluid heating tubes extending across said burner port, fuel burning apparatus comprising a conduit for conveying a stream of pulverized fuel and air and terminating in a section of elongated cross-section transversely of said burner port tubes, means for dividing the fuel stream into a series of small streams arranged side-by-side in a single row transversely of said burner port tubes, and a series of burner tip members arranged to receive corresponding fuel streams, adjoining burner tip members being arranged in successive groups with the burner tip members of each group having their discharge ends offset from their fuel inlet ends and in alignment longitudinally of corresponding burner port tubes.

4. In a furnace having a burner port in one of the walls thereof, and a row of spaced horizontally arranged fluid-heating tubes extending across said burner port, fuel burning apparatus comprising a conduit for conveying a stream of pulverized fuel and air and terminating in a section of elongated cross-section transversely of said burner port tubes, means for dividing the fuel stream into a series of small streams arranged side-by-side in a row transversely of said burner port tubes, and a series of burner tip members arranged to receive corresponding fuel streams, said burner tip members being arranged in groups with the burner tip members of each group having their discharge ends in alignment longitudinally of corresponding subjacent burner port tubes.

5. In a furnace having a burner port in one of the walls thereof, and a row of spaced fluid-heating tubes extending across said burner port, fuel burning apparatus comprising a conduit for conveying a stream of pulverized fuel and air and terminating in a section of elongated cross-section transversely of said burner port tubes, means for dividing the fuel stream into a series of small streams arranged side-by-side in a row transversely of said burner port tubes, and a series of burner tip members arranged to receive corresponding fuel streams, adjoining burner tip members being arranged in successive groups with the burner tip members of each group having their discharge ends in alignment longitudinally of and arranged to impinge on corresponding burner port tubes at opposite sides of said stream dividing means.

6. In a furnace having a burner port in one of the walls thereof, and a row of spaced horizontally arranged flow dividing members extending across said burner port, fuel burning apparatus comprising a conduit for conveying a stream of pulverized fuel and air and terminating in a section of elongated cross-section transversely of said burner port members, means for dividing the fuel stream into a series of small streams arranged side-by-side in a row transversely of said burner port members, and a series of burner tip members arranged to receive corresponding fuel streams, adjoining burner tip members being arranged in successive groups with the burner tip members of each group having their discharge ends in alignment longitudinally of and arranged to impinge on corresponding subjacent burner port members.

7. In a furnace having a burner port in one of the walls thereof, fuel burning apparatus comprising a conduit for conveying a stream of fuel and terminating in an elongated cross-section transversely of said burner port, means for dividing the fuel stream into a series of small streams arranged side-by-side in a row transversely of said burner port, and a series of burner tip members arranged to receive corresponding fuel streams, adjoining burner tip members being arranged in successive groups with the burner tip members of each group having their discharge ends in spaced alignment longitudinally of said burner port.

8. A fuel burner comprising a conduit for conveying a stream of pulverized fuel and air and terminating in a section of elongated cross-section, means for dividing the flattened fuel stream into a series of small streams arranged side-by-side in a single row, and a series of burner tip members arranged to receive corresponding fuel streams, said burner tip members being arranged in groups with each burner tip member having its discharge end offset from its fuel inlet end and in spaced alignment with the discharge ends of the remaining burner tip members of said group.

9. Apparatus for burning pulverized fuel comprising a fuel burner having a series of downwardly discharging burner tip members with their upper fuel inlet ends arranged side-by-side in a single row, and a supply conduit for conveying a stream of pulverized fuel and air to said fuel burner, said supply conduit having its portion approaching said fuel burner formed by a horizontally arranged straight section of uniform circular cross-section, a transition section progressively changing from the circular cross-section of said straight section to a flattened rectangular cross-section of the same area elongated in a direction parallel to said row of burner tip member fuel inlet ends, and a downwardly curved flaring distributor section of rectangular cross-section and constant flow area elongated in a direction parallel to the elongation of said transition section, and means at the lower end of said distributor section for dividing said pulverized fuel-air stream into small streams corresponding in number to said burner tip members.

10. Apparatus for burning pulverized fuel comprising a fuel burner having a series of downwardly discharging burner tip members with their upper fuel inlet ends arranged side-by-side in a single row, and a supply conduit for conveying a stream of pulverized fuel and air to said fuel burner, said supply conduit having its portion approaching said fuel burner formed by a horizontally arranged straight section of uniform circular cross-section, a transition section having a length approximately twice the diameter of said straight section and progressively changing from the circular cross-section of said straight section to a flattened rectangular cross-section of similar area elongated in a direction parallel to said row of burner tip member fuel inlet ends, and a flaring distributor section of rectangular cross-section and similar area elongated in a direction parallel to the elongation of said transition section and downwardly curved with an arcuate length between 80°-120°, and means at the lower end of said distributor section for dividing said pulverized fuel-air stream into small streams corresponding in number to said burner tip members.

11. In a furnace having a burner port in one of the walls thereof, and a row of spaced horizontally arranged fluid heating tubes extending across said burner port, fuel burner apparatus comprising a conduit for conveying a stream of pulverized fuel and air and terminating in a section of elongated cross-section longitudinally of said burner port tubes, means for dividing the fuel stream into a series of small streams arranged side-by-side in a single row longitudinally of said burner port tubes, and a series of burner tip members arranged to receive corresponding fuel streams, adjoining burner tip members being arranged in different groups with the burner tip members of each group having their discharge ends extending longitudinally of the same subjacent burner port tube.

12. In a furnace having a burner port in one of the walls thereof, and a row of spaced horizontally arranged fluid heating tubes extending across said burner port, fuel burning apparatus comprising a conduit for conveying a stream of pulverized fuel and air and terminating in a section of elongated cross-section longitudinally of said burner port tubes, means for dividing the fuel stream into a series of small streams arranged side-by-side in a single row longitudinally of said burner port tubes, and a series of burner tip members arranged to receive corresponding fuel streams, adjoining burner tip members being arranged in different groups with the burner tip members of each group having their discharge ends offset from their fuel inlet ends and in alignment longitudinally of the same subjacent burner port tube.

13. In a furnace having a burner port in one of the walls thereof, and a row of spaced horizontally arranged fluid heating tubes extending across said burner port, fuel burning apparatus comprising a conduit for conveying a stream of pulverized fuel and air and terminating in a section of elongated cross-section longitudinally of said burner port tubes, means for dividing the fuel stream into a series of small streams arranged side-by-side in a single row longitudinally of said burner port tubes, and a series of burner tip members arranged to receive corresponding fuel streams, adjoining burner tip members being arranged in different groups with the burner tip members of each group having their discharge ends in alignment longitudinally of the same subjacent burner port tube and the discharge ends of adjacent burner tip members being arranged at opposite sides of said stream dividing means.

14. In a furnace having a burner port in one of the walls thereof, and a row of spaced fluid heating tubes extending across said burner port, fuel burning apparatus comprising a conduit for conveying a stream of pulverized fuel and air and terminating in a section of elongated cross-section longitudinally of said burner port tubes, means for dividing the fuel stream into a series of small streams arranged side-by-side in a single row longitudinally of said burner port tubes, and a series of burner tip members arranged to receive corresponding fuel streams, adjoining burner tip members being arranged in different groups with the burner tip members of each group having their discharge ends in alignment longitudinally of the same burner port tube, and corresponding burner tip members of said groups having their discharge ends in alignment transversely of said burner port tubes.

15. In a furnace having a burner port in one of the walls thereof, fuel burning apparatus comprising a conduit for conveying a stream of fuel and terminating in a section of elongated cross-section longitudinally of said burner port, means for dividing the fuel stream into a series of small streams arranged side-by-side in a single row longitudinally of said burner port, and a series of burner tip members arranged to receive corresponding fuel streams, adjoining burner tip members being arranged in different groups with the burner tip members of each group having their discharge ends offset from their fuel inlet ends and in spaced alignment longitudinally of said burner port.

RALPH M. HARDGROVE.